United States Patent [19]

Noda et al.

[11] Patent Number: 5,182,161
[45] Date of Patent: Jan. 26, 1993

[54] SUPPORT FOR PHOTOSENSITIVE MATERIALS

[75] Inventors: Touru Noda, Matsudo; Masayuki Tsubaki; Yasunosuke Sakai, both of Tokyo, all of; Tetsuya Ashida, Seattle, Wash.; Hiroshi Matsuda, Tokyo, Japan

[73] Assignee: Mitsubishi Paper Mills Limited, Tokyo, Japan

[21] Appl. No.: 727,820

[22] Filed: Jul. 9, 1991

[30] Foreign Application Priority Data

Jul. 10, 1990 [JP] Japan .................. 2-182096
Jul. 23, 1990 [JP] Japan .................. 2-194169

[51] Int. Cl.$^5$ .............................................. B32B 9/00
[52] U.S. Cl. .................................... 428/195; 428/340; 428/341; 428/342; 428/481; 428/537.1; 428/913; 430/531; 430/532; 430/533; 430/538; 162/72
[58] Field of Search ............... 428/195, 340–342, 428/457–458, 481, 537.5, 913; 430/531–539; 162/72

[56] References Cited

U.S. PATENT DOCUMENTS

| | | | |
|---|---|---|---|
| 3,501,298 | 3/1970 | Crawford | 96/85 |
| 4,184,912 | 1/1980 | Payton | 162/72 |
| 4,220,471 | 9/1980 | Date et al. | 430/532 |
| 4,353,981 | 10/1982 | Noda | 430/536 |
| 4,482,628 | 11/1984 | Katsura | 430/538 |

FOREIGN PATENT DOCUMENTS 0362823 11/1990 European Pat. Off. .
2058866 4/1981 United Kingdom .

*Primary Examiner*—Patrick J. Ryan
*Assistant Examiner*—Elizabeth Evans
*Attorney, Agent, or Firm*—Cushman, Darby & Cushman

[57] ABSTRACT

There is disclosed a support for photosensitive materials which comprises base paper comprising natural kraft pulp, and a resin layer formed on the base paper, said natural kraft pulp being produced by digesting wood chips by the kraft process, and washing the digested product in the presence of an anti-foaming agent or a foam-inhibitor, followed by bleaching by the use of chlorine or an oxidizing agent containing at least one chlorine atom, and said natural kraft pulp having a number of areas tarnished by silver tarnishing reaction of 20 or less. This support exhibits good photographic properties when a silver halide photosensitive layer is provided thereon.

14 Claims, No Drawings

SUPPORT FOR PHOTOSENSITIVE MATERIALS

BACKGROUND OF THE INVENTION

The present invention relates to a support for resin-coated-paper type photosensitive materials which is obtained by coating a paper substrate (hereinafter referred to as "base paper") composed mainly of natural pulp with a resin having film-forming properties, preferably a polyolefin resin. Particularly, it relates to a support for resin-coated-paper type photosensitive materials which exhibits good photographic properties when a silver halide photosensitive emulsion layer is provided thereon.

Supports for resin-coated-paper type photosensitive material which are obtained by coating at least one side of a substrate with a resin having film-forming properties, are well known. For example, Jap. Pat. Pub. No. SHO 55 (1980)-12584 discloses a technique concerning a support for photosensitive materials which is obtained by coating base paper with a resin having film-forming properties, preferably a polyolefin resin. U.S. Pat. No. 3,501,298 discloses a technique concerning a support for photosensitive materials which is obtained by coating both sides of base paper with a polyolefin resin. Since the employment of a quick processing method for development of silver halide photographic photosensitive materials, supports for photosensitive material which are obtained by coating both sides of base paper with a polyethylene type resin have been mainly used in practice for producing photographic paper. Depending on requirements, a titanium dioxide pigment is usually included in a resin layer on one side, i.e., the image-forming side in order to impart a fine definition.

However, supports for resin-coated-paper type photosensitive materials which are obtained by coating base paper composed mainly of natural pulp with a resin having film-forming properties have had an inherent and serious problem affecting harmfully on photographic properties of a silver halide photosensitive layer when it is applied thereon.

To describe the problem in detail, when a silver halide photosensitive material produced using as support, a resin-coated paper obtained by coating base paper composed mainly of natural pulp with a resin having film-forming properties is stored after production, in particular, when the photosensitive material is stored under a high temperature and a high humidity circumstance, the silver halide of the photosensitive material undergoes spotty fog with an increase of the storage period, so that the unexposed portion has developable spots during development processing, or that sensitivity of the photosensitive material is decreased or increased spot-wise. For example, in the case of a certain positive type black-and-white silver halide photographic paper, spotty fogs occur on a white background. The spot-wise fog has a diameter of as large as twenty and several millimeters in some cases, and the photographic paper loses its commercial value completely. In the case of a photosensitive material of a certain type using a silver complex diffusion transfer process which comprises the resin-coated paper as a support for a silver halide negative photosensitive layer, fogs develops spot-wise in the [negative] silver halide photosensitive layer, image to be transferred therefrom and formed on a positive sheet is low in density spot-wise, or is hardly formed. Therefore, that photosensitive material loses its commercial value completely. In the case of multi-layered silver halide color photographic paper of a certain type comprising the resin-coated paper as support and color developing layers provided thereon in the order of yellow, magenta and cyan, fogs develops spot-wise in those layers, particularly, in yellow and magenta color layers, where sensitivity deteriorates spot-wise, so that color balance of image to be developed is upset and that photosensitive material loses commercial value. Hereinafter, the defective phenomena described above are generically called "the spot trouble".

There have been proposed various stabilizers or fog inhibitors for preventing the change of the photographic characteristics of silver halide photosensitive materials during storage. However, the addition of the various stabilizers or fog inhibitors in a layer constituting a silver halide photosensitive material comprising resin-coated paper as support has been hardly able to eliminate the spot trouble; moreover, use of them has tended to bring about no small and harmful effects on the photographic performance such as sensitivity degradation, contrast degradation, etc.

There are several proposals concerning the photographic properties of supports for photosensitive materials. In Jap. Pat. Pub. No. SHO 54 (1979)-9884, there has been proposed a non-fogging support for resin-coated paper type photosensitive materials which is obtained by coating base paper with a polyolefin resin containing a hydroxy-substituted triazolopyrimidine compound. An embodiment of this art, however, proved to be too poor to eliminate the spot trouble of a silver halide photosensitive material making use of the support. As to paper for photography, it has been proposed in Jap. Pat Appln. Kokai (Laid-Open) No. SHO 52 (1977)-65423 and Jap. Pat. Pub. No. SHO 58 (1983)-43730 to remove the undesirable influence of the decomposition of a cationic electrolyte and additives for paper, respectively, on photographic properties. In silver halide photosensitive materials obtained by using as support, resin-coated paper comprising such paper for photography, the spot trouble cannot be prevented at all, and it has been proved that the spot trouble is caused by a mechanism utterly different from the mechanisms described in the specifications of the above references. In Jap. Pat. Appln. Kokai (Laid-Open) Nos. HEI 2 (1990)-96741, HEI 2 (1990)-99689 and HEI 2 (1990)-99693, there have been proposed techniques for improving the photographic properties of unbleached kraft paper. These techniques can impart satisfactory photographic properties to bleached kraft paper but unsatisfactory photographic properties to unbleached kraft paper. The cause for this is that propylene oxide and/or silicone compound used in a defoaming agent used before bleaching step remain in base paper. It has been proposed to improve the photographic properties of unbleached kraft pulp by specifying a defoaming agent and a cold water extraction pH of the pulp. However, in a silver halide photosensitive material obtained by using as substrate, resin-coated paper comprising base paper composed mainly of bleached natural pulp prepared by applying the aforesaid technique, the spot trouble cannot be prevented at all, and it has been proved that the spot trouble is caused by a mechanism utterly different from the mechanisms described in the specifications of the above references. In addition, in Jap. Pat. Pub. No. SHO 58 (1983)-43732, there has been proposed a technique for improving the shelf life of a silver halide photographic material by using resin-coated paper comprising base paper composed mainly of natural pulp bleached by the use of a peroxide at a alkaline pH. But, the employment of this resin-coated paper permits insufficient prevention of the spot trouble. Furthermore, in Jap. Pat. Pub. No. SHO 59 (1984)-38575, there has been proposed a technique for preventing the fog and the spot trouble of a silver halide photographic material by the use of paper for photography made of wood pulp obtained by the oxygen pulping process. But, the employment of resin-coated paper comprising the paper for photography as substrate also permits insufficient prevention of the spot trouble.

As described above, there have not been known at all a technique for removing the spot trouble of a silver halide photosensitive material comprising as substrate, resin-coated paper obtained by coating base paper composed mainly of natural pulp with a resin having film-forming properties, and a mechanism or cause of the occurrence of the spot trouble. Moreover, the spot trouble has not been able to be removed at all by a conventional technique.

SUMMARY OF THE INVENTION

Accordingly, an object of the present invention is to provide a support for photosensitive materials which is obtained by coating base paper composed mainly of natural pulp with a resin having film-forming properties, and in which vulnerability to spot trouble when a silver halide photosensitive layer is formed thereon is markedly repressed. Other and further objects of the present invention will become apparent from the following description in the specification.

The present inventors earnestly investigated in order to solve such problems and consequently found that the above object can be achieved by using base paper comprising specified natural kraft pulp.

According to the present invention, there is provided a support for photosensitive materials which comprises base paper comprising natural kraft pulp, and a resin layer formed on the base paper, said natural kraft pulp being produced by digesting wood chips by the kraft process, and washing the digested product in the presence of a defoaming agent or a foam-inhibitor, followed by bleaching by the use of chlorine or an oxidizing agent containing at least one chlorine atom, and said natural kraft pulp having a number of areas tarnished by silver tarnishing reaction defined in the present specification of 20 or more.

DETAILED DESCRIPTION OF THE INVENTION

The support of the present invention comprises base paper, a resin layer formed on the base paper, and preferably a subbing layer formed on the resin layer.

First, the base paper is explained below.

The base paper comprises natural kraft pulp as an essential constituent.

The natural kraft pulp is produced by cooking by the kraft process, washing in the presence of a defoaming agent or a foam-inhibitor before bleaching, and bleaching treatment in a subsequent bleaching step. The number of spots tarnished by silver tarnishing reaction defined in the present specification of the natural kraft pulp is 20 or less.

The term "the number of areas tarnished by silver tarnishing reaction" used in the present specification means a number reckoned in the following manner. A natural kraft pulp sample (sample conditions; basis weight: 750 g/m$^2$±150 g/m$^2$, water content based on oven-dry weight: 20 wt%±5 wt%, pH; 6.0 to 7.5 in terms of the pH of a pulp suspension prepared in accordance with Tappi standard T205) is brought into close contact with the silver surface of a plate prepared in accordance with Tappi standard T444. The resulting assembly is enclosed in a black polyethylene bag, and a load of 2.5 kg per area of 297 mm×210 mm was applied thereon, followed by heat treatment at a temperature of 50° C.±1° C. and a relative humidity of 81% ±2% for 50 hours. Then, there is reckoned the number of spots tarnished by silver tarnishing reaction per area of 297 mm×210 mm on the silver surface.

As a result of research, the present inventors found the following fact. When natural kraft pulp is washed in the brown stock washing step in the presence of a defoaming agent or a foam-inhibitor after cooking, a water-insoluble or slightly water-soluble substance capable of causing silver tarnishing reaction which originates from a black liquor component or a black liquor derivative, is absorbed on pulp fiber by influence of the defoaming agent or foam-inhibitor and remains there. Surprisingly, the substance capable of causing silver tarnishing reaction withstands an attack from an oxidizing agent or an alkalifying agent in a subsequent bleaching step and remains in bleached natural kraft pulp, and moreover it remains locally also in base paper obtained by beating the bleached natural kraft pulp and making the same into paper. Consequently, the substance capable of causing silver tarnishing reaction causes the spot trouble.

As the natural kraft pulp used in the present invention, there can be advantageously used wood kraft pulps such as softwood kraft pulp, hardwood kraft pulp, softwood-hardwood mixed kraft pulp, etc. As the wood kraft pulps, there can be advantageously used those obtained in the following manner. Wood chips are placed in a vessel and treated under pressure and heat (i.e. so-called cooking) with a solution (i.e. so-called white liq.) containing sodium hydroxide and sodium sulfide as essential chemical components to remove non-cellulosic components of wood, e.g. lignin. The cooked mass is subjected to a so-called brown stock washing step, where fibers are washed and separated from the rest, i.e. so-called black liquor, and where a defoaming agent or foam-inhibiting agent is added to improve washing efficiency. The fiber thus washed in turn is bleached. Said cooking liquor may contain, as additional chemical components, salts such as sodium carbonate, sodium sulfate, slaked lime, calcium carbonate and the like, and cooking aids such as sodium borohydride, anthraquinone compounds and the like. A variations of the cooking method such as polysulfide cooking, batchwise or continuous cooking, etc. may be employed. Sulfidity and Kappa number of the cooking step are not critical so long as commercially viable. There can be also employed an oxygen pulping process disclosed in Jap. Pat. Pub. No. SHO 59 (1984)-38575.

Although the base paper used in the present invention comprises natural kraft pulp, preferably wood kraft' pulp, there may also be used base paper comprising a combination of natural kraft pulp and optionally natural pulp other than natural kraft pulp, synthetic fiber or synthetic pulp. As the pulp used in combination with natural kraft pulp, natural pulp is preferable and wood sulfite pulps such as softwood sulfite pulp, hardwood sulfite pulp, softwood-hardwood mixed sulfite pulp and the like are particularly preferable. There can also be used a soda pulp, dissolving pulp, etc.

As the defoaming agent or foam-inhibitor used in the present invention, various defoaming agents and foam-inhibitors can be used. There can be used, for example, those comprising higher fatty acid alcohol ester compounds, mineral oil, liquid hydrocarbon oil, silicone oil, etc., which are disclosed in Jap. Pat. Appln. Kokai (Laid-Open) Nos. SHO 54 (1979)-59404, SHC 58 (1983)-220896, SHO 61 (1986)-245391 and SHO 61 (1986)-245319, U.S. Pat. Nos. 3,923,638 and 4,107,073, etc. Among them, water-based or oil-based anti-foaming agents and foam-inhibitors which comprise mineral oils or liquid hydrocarbon oils are particularly preferable from the viewpoint of defoaming properties or foam-inhibiting properties. The defoaming agent or foam-inhibitor used in the present invention may contain components such as hydrophobic silica, ethylene-bis-higher alkylamides, silicone oil, etc. Places and methods of adding the agent may vary depending on the brown stock washing process and may be suitably adjusted; in may be added to a thickener or to a slurry of the fiber.

The natural kraft pulp, preferably the wood kraft pulp, used in the present invention is obtained by carrying out a bleaching treatment in a bleaching step after cooking and washing. As the bleaching treatment, chlorine treatment, alkali treatment, extraction, hypochlorite bleaching, chlorine dioxide bleaching, and multi-stage bleaching comprising a combination thereof are preferable. If necessary, there may be conducted a peroxide bleaching at alkaline pH and a reduction bleaching using hydrosulfite, sodium borohydride or the like, which are disclosed or exemplified in Jap. Pat. Pub. No. SHO 58 (1983)-43732. In the present specification, the term "bleaching step" means treatment with chlorine or an oxidizing agent containing at least one chlorine atom.

A preferable multistage bleaching process of wood kraft pulp which can be advantageously employed in the present invention is as follows. The fist step is a chlorine treatment step (hereinafter abbreviated as C), the second step is an alkali-treatment or extraction step (hereinafter abbreviated as E), and the third step is a hydrochlorite bleaching step (hereinafter abbreviated as H) or a chlorine dioxide bleaching step (hereinafter abbreviated as D). A step of peroxide bleaching at alkaline pH (hereinafter abbreviated as P) is optionally carried out as the fourth step or a later step. For example, the following processes are useful: "C E H D E D", "C E H D P D", "C E H D E D P", "C E H E D", "C E H P D", "C E H E D P", "C E H E H", "C E H E H P", "C E H P H P", "C E D E D" and "C E D E D P".

As a chemical for bleaching the wood kraft pulp which can be advantageously used in the present invention, chlorine gas or an aqueous chlorine solution is used for the chlorine bleaching. Chlorine dioxide may be used together with it. Although employment of sodium hydroxide is advantageous for the alkali treatment or the extraction, there can be used calcium hydroxide, and the like and mixture thereof. For the hypochlorite bleaching, there can be advantageously used hypochlorite bleaching liquors prepared by blowing chlorine gas into a slaked lime milk (i.e., so-called calcium-hypo bleaching liquor) or a diluted sodium hydroxide solution (i.e. sodium-hypo liquor). For the chlorine dioxide bleaching, there can be advantageously used chlorine dioxide prepared by a sulfite acid process such as Mathieson process, New Mathieson process, Ernst process, C. I. P. process, etc. or a hydrochloric acid process such as Kesting process, Nissoh process, Solvay process, etc. For the peroxide bleaching at alkaline pH, there can be advantageously used inorganic or organic peroxides such as hydrogen peroxide, sodium peroxide, a peroxide bleaching liquor (an aqueous mixed solution consisting of hydrogen peroxide, sodium hydroxide, sodium silicate and optionally magnesium sulfate) and mixtures thereof. As an alkali used for the peroxide bleaching, there can be advantageously used hydroxides of alkali metals or alkaline earth metals, for example, sodium hydroxide, potassium hydroxide, aqueous ammonia, magnesium hydroxide and calcium hydroxide, and mixtures of the hydroxides. As the bleaching conditions, there can be employed various conditions such as the conditions described in Paper an Pulp Technique Association, "Pulp Shori oyobi Hyohaku" (Pulp Treatment and Bleaching), published on Jan. 27, 1968 and Jap. Pat. Pub. No. SHO 58 (1983)-43732.

For the natural kraft pulp, preferably the wood kraft pulp, used in the present invention, the number of spots tarnished by silver tarnishing reaction defined in the present invention is 20 or less, preferably 10 or less, more preferably 5 or less, most preferably 2 or less (inclusive of zero). Research by the present inventors revealed that specifically, natural kraft pulp, preferably wood kraft pulp, having a number of areas tarnished by silver tarnishing reaction of 20 can be obtained, for example, by any of the following methods, preferably a combination of two or more thereof, more preferably a combination of three or more thereof.

(1) The amount of the anti-forming agent used is adjusted to 0.1 to 1.5 kg, preferably 0.1 to 1.0 kg, more preferably 0.1 to 0.75 kg in terms of its constituents (as solid in the case of a water-based defoaming agent) per ton (hereinafter based on over-dry basis unless otherwise stated) of pulp.

(2) The pH of a thickener for unbleached kraft pulp before the bleaching step is adjusted to 6.0 or higher, preferably 6.5 or higher, more preferably 7.0 or higher. The pH of the thickener for unbleached kraft pulp is measured by adding 300 g of distilled water to 50 g of the thickener for unbleached kraft pulp, stirring them thoroughly for 1 hour, and then measuring the pH of the resulting liquid at a liquid temperature of 25° C.±1° C. by means of a pH meter.

(3) The electric conductivity of unbleached kraft pulp on a thickener right before the bleaching step is regulated to 50 $\mu$/cm or more, preferably 100 u$\mu$/cm or more, more preferably 150 $\mu$/cm or more. To determine the electric conductivity characteristics of pulp, 50 g of pulp sampled from the thickener is diluted with 300 g deionized water, and stirred thoroughly for 1 hour. The resulting pulp liquid is subjected to a conductivity meter to measure its electric conductivity at a liquid temperature of 25° C.±1° C.

(4) The calcium content of unbleached kraft pulp right before the bleaching step is kept as low as possible. Specifically, when a sheet is prepared of the pulp on the thickener right before the bleaching step, calcium content of this sheet should be 5,000 ppm or less, preferably 4,000 ppm or less, more preferably 3,000 ppm or less. The preparation of the sheet of the pulp on the thickener is carried out in accordance with Tappi standard T-205, except for using deionized water. The calcium content of the paper is measured by a fluorescent X-ray technique.

(5) Calcium content of white water (i.e. filtrate) of the thickener right before bleaching step is kept as low as possible. For this purpose, source of calcium must be checked for the cooking step, for example, selection of species of wood being used, removal of insoluble calcium salts such as calcium hydroxide and calcium carbonate from cooking liquid (white liquid) by filtration (i.e. white liquid polishing). It is preferable to add a chelating agent such as sodium-EDTA salt to the white water being recycled at the thickener.

(6) The pH of a kraft pulp slurry in the chlorine treatment step is adjusted to 2.5 or lower, preferably 2.0 or lower, more preferably 1.5 or lower.

(7) Bleached kraft pulp before a paper-making step is cleaned by using a cleaner, preferably a liquid-cyclone type cleaner. For this purpose, total reject in the cleaner is 0.02% by weight or more, preferably 0.05% by weight or more, more preferably 0.1% by weight or more, based on the oven-dry weight of the pulp.

Various additives may be put into paper stock from which the base paper to be used in the present invention during the stock preparation step. Following additives, in proper combination of two or more thereof may be advantageously made use of: sizing agents such as fatty acid metal salts and/or fatty acids, the alkylketene dimmer emulsified products or epoxidized higher fatty acid amides which are disclosed in Jap. Pat. Pub. No. 62 (1987)-7534, alkenyl- or alkylsuccinic anhydride emulsified products, rosin derivatives, etc.; dry-paper strengthening agents such as anionic, cationic or amphoteric polyacrylamides, polyvinyl alcohols, cationic starch, vegetable galactomannan, etc.; wet-paper strengthening agents such as polyamine-polyamide epichlorohydrin resins, etc.; fillers such as clay, kaolin, calcium carbonate, titanium oxide, etc.; bonding agents such as water-soluble aluminum salts including aluminum chloride, sulfuric acid alumina, and the like; pH adjustors such as sodium hydroxide, sodium carbonate, sulfuric acid, etc.; and the coloring pigments, coloring dyes, fluorescent whitening agents and the like, which are disclosed in Jap. Pat. Appln. Kokai (Laid-Open) Nos. SHO 63 (1988)-204251, HEI 1 (1989)-266537, etc.

Various water-soluble polymers antistatic agents and additives can be added in the base paper used in the present invention by spraying or with a tab size press. It is advantageous to add, for example, the following materials in proper combination of two or more thereof: water-soluble polymers such as the starch type polymers, polyvinyl alcohol type polymers, gelatin type polymers, polyacrylamide type polymers, cellulose type polymers and the like, which are disclosed or exemplified in Jap. Pat. Appln. Kokai (Laid-Open) No. HEI 1 (1989)-266537; antistatic agents such as alkali metal salts (e.g. sodium chloride and potassium chloride), alkaline earth metal salts (e.g. calcium chloride and barium chloride), colloidal metal oxides (e.g. colloidal silica), organic antistatic agents (e.g. polystyrene sulfonates), etc.; latices and emulsions such as petroleum resin emulsions, and latices of styrene-acylic acid-acrylic ester copolymers, styrene-acrylic acid-butadiene copolymers, ethylene-vinyl acetate copolymers, styrene-maleic acid-acrylic ester copolymers and the like; pigments such as clay, kaolin, talc, barium sulfate, titanium oxide, etc.; pH adjustors such as hydrochloric acid, phosphoric acid, citric acid, sodium hydroxide, etc.; and the above-mentioned coloring pigments, coloring dyes and fluorescent whitening agents.

The base paper used in the present invention is one which has a smooth surface having a Bekk smoothness prescribed in JIS P 8119 of preferably 100 seconds or less, more preferably 200 seconds or more. For producing base paper having a Bekk smoothness of 100 or more, there is usually used hardwood pulp which permits easy attainment of smoothness by the use of short fiber, and it is beaten with a beating machine so as to reduce the content of long fiber as much as possible. Specifically, the beating of the pulp is preferably conducted as follows. The fiber length after the beating is adjusted so as to adjust the amount of 42-mesh residue to 20 to 45%, and the freeness is adjusted to 200 to 350 CSF. Subsequently, the stuff slurry containing the incorporated agents is made into paper so as to obtain a uniform formation, with a conventional paper machine such as Fourdrinier paper machine, cylinder paper machine or the like by a suitable paper making method, for example, any of the methods disclosed or exemplified, for instance, in Jap. Pat. Appln. Kokai (Laid-Open) Nos. SHO 58 (1983)-37642, SHO 61 (1986)-260240 and SHO 61 (1986)-284762. After the paper making, calendering is conducted by means of a machine calender, super calender, hot calender or the like, whereby base paper having a Bekk smoothness of 100 seconds or more can be produced. Although the thickness of the base paper is not critical, its basis weight is preferably 40 to 250 g/m$^2$.

Next, the resin layer is explained below.

As a resin constituting the resin layer, there are preferably used thermoplastic resins having film-forming properties, such as polyolefin resins, polycarbonate resins, polyester resins, polyamide resins, etc. Of these, the polyolefin resins are more preferable from the viewpoint of melt extrusion coating properties. The base paper may be coated with the electron-beam-setting resin disclosed or exemplified in Jap. Pat. Pub. No. 60 (1985)-17104.

The polyolefin resins include homopolymers (e.g. polyethylenes, polypropylene, polybutenes and polypentenes), copolymers of two or more $\alpha$-olefins (e.g. ethylene-butylene copolymers), and mixtures thereof. Polyethylene resins are particularly preferable from the viewpoint of, in particular, melt extrusion coating properties and adhesive properties to the base paper. The polyethylene resins include low-density poly-ethylenes, medium-density polyethylenes, high-density polyethylenes, straight-chain low-density polyethylenes, copolymers of ethylene and an $\alpha$-olefin such as propylene, butylene or the like, mixtures thereof. There can be used polyethylene resins various in density, melt flow rate (hereinafter abbreviated merely as MFR), molecular weight, and molecular weight distribution, though usually, polyethylenes having a density of 0.90 to 0.97 g/cm$^3$, a MFR of 1 to 30 g/10 min, preferably 3 to 15 g/10 min, and a molecular weight of 20,000 to 250,000 can be advantageously used singly or as a mixture thereof. When the resin layer has a multilayer structure, resins different in properties and constitution can be used. For example, a resin having a MFR of 5 to 20 g/10 min is used as a resin for an outermost layer, and a resin having a MFR of 2 to 10 g/10 min is used as a resin for a sublayer.

Various additives can be included in the resin layer of the support for photosensitive materials of the present invention. For example, the following various additives can be included in proper combination of two or more thereof: the white pigments (e.g. titanium oxide, zinc oxide, talc and calcium carbonate), the fatty acid amides (e.g. stearic acid amide and arachidic acid amide) and fatty acid metal salts (e.g. zinc stearate, calcium stearate, aluminum stearate, magnesium stearate, zinc palmitate, zinc myristate and calcium palmitate) which are disclosed or exemplified in Jap. Pat. Pub. Nos. SHO 60 (1985)-3430, SHO 63 (1988)-11655, HEI 1 (1989)-38291 and HEI 1 (1989)-3829, Jap. Pat. Appln. Kokai (Laid-Open) No. Hei 1 (1989)-105245, etc.; the various antioxidants (hindered phenols, hindered amines, phosphorus-containing anitoxidants and sulfur-containing antioxidants), the blue pigments and dyes (e.g. cobalt blue, ultramarine, blue and phthalocyanine blue) and the magenta pigments and dyes (e.g. cobalt violet, fast violet and manganase violet) which are disclosed or exemplified in Jap. Pat. Appln. Kokai (Laid-Open) HEI 1 (1989)-105245; and the fluorescent whitening agents and ultraviolet absorbing agents which are disclosed or exemplified in Jap. Pat. Appln. No. HEI 1 (1989)-77549. These additives are preferably included in a master batch or a compound which comprises a resin having film-forming properties. When the resin having film-forming properties is a thermoplastic resin, preferably a polyethylene resin, the resin layer is formed preferably by a melt extrusion coating method in which running base paper is coated with molten resin. It is preferable to subject the base paper to an activation treatment such as corona treatment, flame treatment, etc. before coating the base paper with the resin.

The surface on the photosensitive layer side of the support for photosensitive materials of the present invention is a lustrous surface; the slightly rough surface disclosed in Jap. Pat. Pub. No. SHO 62 (1987)-19732 which does not affect the lust of the surface of a photosensitive material produced by the use of the support; a matte surface; a silky surface; or the like. The reverse is usually a dull surface. The obverse or optionally both the obverse and the reverse can be subjected to an activation treatment such as corona treatment, flame treatment, etc. Although the thickness of the resin layers on the obverse and the reverse is not critical, a thickness of approximately 10 to 50 $\mu$ is usually advantageous.

In the support for photosensitive materials of the present invention, a subbing layer comprising a hydrophilic polymer is preferably formed on the resin layer on the side of the support on which a silver halide photosensitive layer is to be formed.

As a method for forming the subbing layer used in the present invention on the resin layer, there is preferably employed so-called on-machine coating in which the surface of running base paper is coated with a resin having film-forming properties, and then a subbing layer is formed on the resin layer on the side on which a silver halide photosensitive layer is to be formed, before winding up the base paper, by applying a subbing fluid comprising a hydrophilic polymer, followed by drying. There can also be employed so-called off-machine coating in which after winding up resin-coated paper, the wound-up paper is stored if necessary, and then a subbing layer is formed. As an apparatus for applying the subbing fluid, there can be exemplified air knife coater, roll coater, bar coater, wire bar coater, blade coater, slide hopper coater, curtain coater, gravure coater, flexo gravure coater, and combinations thereof. It is preferable to subject the resin surface to an activation treatment such as corona treatment, flame treatment, etc. before applying the subbing fluid. As an apparatus for drying the applied subbing fluid, there can be exemplified various drying apparatus including hot-air dryers such as linear tunnel dryer, arch dryer, air loop dryer, sine curve air float dryer and the like; and dryers using infrared rays, a heating dryer, a microwave, etc. Although any drying conditions may be employed, the drying is conducted usually at 60° to 150° C. for several seconds to 10 minutes.

The hydrophilic polymer constituting the subbing layer used in the present invention is not critical, and various hydrophilic polymers can be used. For example, gelatins, polyvinyl alcohols, starch and the like can be used. Gelatins are particularly preferable from the viewpoint of the adhesion between the support for photosensitive materials and a silver halide photosensitive layer. As preferable gelatins, there can be exemplified various gelatins including lime-treated gelatin, acid-treated gelatin, enzyme-treated gelatin, gelatin derivatives (e.g. reaction products of gelatin with a dibasic acid anhydride), etc. The amount of coating of the subbing layer is not critical. As to the amount of coating of the hydrophilic coloid, preferably gelatin, it is preferable to apply an aqueous coating fluid having a concentration of the hydrophilic coloid of 0.1 to 10% by weight in an amount of 1 to 40 g/m$^2$. It is particularly preferable to apply the aqueous coating fluid in an amount of 0.005 to 2.0 g/m$^2$ in terms of solds. The pH of the subbing fluid is preferably 7.0 or lower, more preferably 6.0 or lower.

Various additives can be included in the subbing layer used in the present invention. For example, the following additives can be included in proper combination of two or more thereof: antiseptics such as the p-hydroxybenzoic acid ester compounds, benzisothiazolone compounds, isothiazolone compounds and the like, which are disclosed or exemplified in Jap. Pat. Appln, Kokai (Laid-Open) No. HEI 1 (1989)-102551; surfactants including anionic surfactants (e.g. alkylbenzenesulfonates and sulfosuccinic acid ester salts), nonionic surfactants (e.g. saponin and alkylene oxides), the fluorinated surfactants disclosed in Jap. Pat. Pub. No. SHO 47 (1972)-9303, U.S. Patent 3,589,906, etc., amino acids, the amphoteric surfactants disclosed or exemplified in Jap. Pat. Appln. Kokai (Laid-Open) No. HEI 1 (1989)-92740, and amphoteric surfactants (e.g. esters of amino alcohols); hardeners including organic hardeners (e.g. active halogen compounds, vinylsulfone compounds, aziridine compounds, epoxy compounds, acryloyl compounds and isocyanate compounds) and inorganic hardeners (e.g. chrome alum and zirconium sulfate); toners; fluorescent whitening agents; matting agents; fog-inhibitors or stabilizers; and pH adjustors.

Various back coating layers can be formed on the support for photosensitive materials of the present invention in order to prevent electrification and curling. In the back coating layers can be included in proper combination the inorganic antistatic agents, organic antistatic agents, hydrophilic binders, latices, curing agents, pigments, surfactants and the like, which are disclosed or exemplified in Jap. Pat. Pub. Nos. SHO 52 (1977)-18020, SHO 57 (1982)-9059, SHO 57 (1982)-53940 and SHO 58 (19834)-56859, and Jap. Pat. Appln. Kokai (Laid-Open) Nos. SHO 59 (1984)-214849 and SHO 58 (1983)-84144, etc.

Various photographic layers can be formed on the support for photosensitive materials of the present invention, and the support can be used for various purpose. For example, the support can be used in photographic paper for color photography, photographic paper for black-and-white photography, photographic paper for phototypesetting, photographic paper for duplication, reversal photographic materials, negatives for silver complex diffusion transfer process, printing materials, etc. There can be formed, for instance, emulsion layers of silver chloride, silver bromide, silver chlorobromide, silver iodobromide, and silver chloroiodobromide. A multilayer silver halide color-photographic layers containing color couplers can be formed. A photosensitive layer for silver complex diffusion transfer process can also be formed. As a binder for the photographic layer, there can be used ordinary gelatin and hydrophilic polymers such as polyvinyl pyrrolidones, polyvinyl alcohols, sulfuric acid ester compounds of polysaccharides, etc. Various additives can be contained in the photographic layer. For example, the following additives can be contained in proper combination of two or more thereof: sensitizing dyes such as cyanine dyes, merocyanine dyes, etc.; chemical sensitizers such as water-soluble gold compounds, sulfur compounds, etc.; anti-fogging agents or stabilizers, such as hydroxy-triazolopyrimidine compounds, mercapto-heterocyclic compounds, etc.; hardening agents such as formalin, vinylsulfone compounds, aziridine compounds, etc.; coating applicability aids such as benzenesulfonates, sulfosuccinic acid ester salts, etc.; anti-staining agents such as dialkylhydroquinone compounds, etc.; fluorescent whitening agents; definition-improving dyes; antistatic agents; pH buffers; fogging agents; and water-soluble iridium or rhodium compounds, which are added at the time of formation of silver halide precipitation.

Photosensitive materials obtained by use of the support of the present invention are subjected, depending on the kind of the photosensitive materials, to the treatments such as exposure, development, termination, fixing, bleaching, stabilization, etc., which are described in Goro Miyamoto, "Photosensitive Materials for Photography and Handling Thereof", hotographic Techniques Course Vol. 2, KYORITU-SHUPPAN Ltd. In particular, multilayer silver halide color-photographic photosensitive materials which are subjected to one-bath bleaching-fixing treatment after color development, can be treated with a color-photographic developing solution comprising any chief ingredient such as CD-III, CD-IV (trade names, Eastman Kodak Co.), Droxychrom (May & Baker Co., Ltd.), etc. In the developing solution comprising such a chief ingredient may be included development accelerators such as benzyl alcohol, thallium salts, phenidone, etc. The multilayer silver halide color-photographic photosensitive materials can be treated also with a developing solution containing substantially no benzyl alcohol. Useful one-bath bleaching-fixing solutions are solutions of metal salts of aminopolycarboxylic acids (e.g. ferric salts of ethylenediaminetetraacetic acid, propylenediaminetetraacetic acid and the like). As a fixing agent, sodium thiosulfate, ammonium thiosulfate, etc. are useful. Various additives can be included in such one-bath bleaching-fixing solutions. For example, the following various compounds can be included in proper combination of two or more thereof: silver elimination accelerators (e.g. the mercaptocarboxylic acids disclosed in U.S. Pat. No. 3,512,979 and the mercapto-heterocyclic compounds disclosed in Belgian Patent No. 682,426), anti-staining agents, pH adjustors or buffers, hardeners (e.g. magnesium sulfate, aluminum sulfate and potassium alum), and surfactants. Although the one-bath bleaching-fixing solution can be used at various pH's, a useful pH range is pH 6.0 to 8.0.

DESCRIPTION OF PREFERRED EMBODIMENTS

The following examples serve to give more specific illustration of the present invention but they are not intended in any way to limit the scope of the present invention.

EXAMPLE 1

By bleaching by the process "C E H D P D", there were obtained the hardwood bleached kraft pulps explained in Table 1, for which the number of spots tarnished by silver tarnishing reaction defined in the specification was as shown in Table 1. The conditions of production process of the hardwood kraft pulps were as follows. The amount of an oil-based anti-foaming agent containing mineral oil as a constituent which was present in a step of washing unbleached kraft pulp, was 0.1, 0.7, 1.0, 1.5 or 2.0 kg per ton based on oven-dry basis of pulp. The electric conductivity of thickener before bleaching defined in the specification was 45 $\mu$/cm, 100 $\mu$/cm or 150 $\mu$/cm. The final reject rate in a liquid-cyclone type cleaner was 0.01, 0.02, 0.05 or 0.1 wt% based on the oven-dry weight of pulp. The above process conditions were adjusted so as to become each of the combinations shown in Table 1, and other process conditions were properly adjusted. When the amount of the anti-foaming agent was less than 0.1 kg, the prevention of foaming was not sufficient.

Subsequently, each bleached kraft pulp was beaten to a Canadian standard freeness of 320 ml. To 100 parts by weight of the beaten pulp were added 3 parts by weight of cationic starch, 0.2 part by weight of an anionic polyacrylamide, 0.4 part by weight (in terms of ketene dimmer) of an alkylketene dimmer emulsified product and 0.4 part by weight of a polyamino-polyamide epichlorohydrin resin, whereby paper having a basis weight of 100 g/m$^2$ was produced. The wet paper thus obtained was dried at 110° C. and then impregnated with an impregnating solution consisting of 3 parts by weight of a carboxy-modified polyvinyl alcohol, 0.05 part by weight of a fluorescent whitening agent, 0.002 part by weight of a blue dye, 0.2 part by weight of citric acid and 97 parts by weight of water, in an amount of 25 g/m$^2$. The impregnated paper was dried by hot air at 110° C. and then supercalendered at a linear pressure of 90 kg/cm. Both sides thereof were subjected to corona treatment to produce base paper for a support for photosensitive materials.

Next, one surface of the base paper was coated by melt extrusion to a thickness of 13 $\mu$ at a resin temperature of 330° C. with a resin composition consisting of 20 parts by weight of a master batch of titanium dioxide pigment composed of 47.5% by weight of a low-density polyethylene resin (density 0.92 g/cm$^3$, MFR 8.5 g/10 min), 50% by weight of an anatase type titanium dioxide pigment surface-treated with hydrated aluminum oxide (0.75% by weight in terms of Al$_2$O$_3$, based on the weight of titanium dioxide) and 2.5% by weight of zinc stearate, 65 parts by weight of a low-density polyethylene resin (density 0.92 g/cm$^3$, MFR 4.5 g/10 min), and 15 parts by a weight of high-density polyethylene resin (density 0.97 g/cm$^3$, MFR 7.0 g/10 min). Before thus forming a resin layer on the surface of the base paper, the other side (the reverse side) of the base paper had been coated by melt extrusion to a thickness of 13 μ at a resin temperature of 330° C. with a resin composition consisting of 15 parts by weight of a low-density polyethylene resin (density 0.92 g/cm³, MFR 2 g/10 min) and 85 parts by weight of a high-density polyethylene resin (density 0.96 g/cm³, MFR 20 g/10 min). In this case, the surface of the resin layer containing the titanium dioxide pigment of the thus produced support for photosensitive materials was processed into a slightly rough surface, and the surface of the resin layer on the reverse side was processed into a matte surface.

Subsequently, the reverse side of the support for photosensitive materials was subjected to corona treatment, after which a back coating layer with a composition of colloidal silica: styrene acrylic latex = 1 : 1 based on dry basis was formed on the reverse side in an amount of 0.4 g/m². Then, the resin surface on the obverse side containing the titanium dioxide pigment of the support for photosensitive materials was subjected to corona treatment, after which an emulsion layer and a protective layer therefor were formed on the resin surface to obtain photographic paper for black-and-white photography. The emulsion layer comprised a neutral-process silver halide emulsion which had a halogen composition of AgBr/AgCl=65/35 and an average particle size of 0.6 μ, had been sensitized to the highest sensitivity by a combination of sulfur sensitization and gold sensitization, comprised substantially crystals of [1, 0, 0] plane, and had been prepared by forming and dispersing silver halide particles in 14.4 g of gelatin in an amount of 19.2 g in terms of silver nitrate in the presence of $1.2 \times 10^{-5}$ g of potassium hexachloroiridate (III). The emulsion layer further comprised gelatin necessary for film formation and adequate amounts of a stabilizer, sensitizing dye, coating assistant, hardener, fluorescent whitening agent, thickener, filter dye, etc. The demulsion layer was coated on the resin surface together with the protective layer in an amount of 2.2 g/m² in terms of silver nitrate and 4.4 g/m² in terms of gelatin so as to place the protective layer on the emulsion layer. The protective layer comprised gelatin in an amount of 2 g/m², a coating assistant and a hardener.

Samples obtained by drying the thus obtained photographic papers after the coating were stored at 50° C. and 80% RH for 4 days. Thereafter, each sample was subjected to black-and-white development, and the number of spots of fog per area of 297 mm×210 mm was reckoned. The results obtained are shown in Table 1.

TABLE 1

| Sample No. | Note 1 | Production process Amount of anti-foaming agent present (kg) | Production process Conductivity of thickener before bleaching (μυ/cm) | Production process Total reject in cleaner (wt %) | Number of spots of silver tarnishing (Note 2) | Number of spots of fog (Note 2) |
|---|---|---|---|---|---|---|
| 1 | ○ | 0.1 | 150 | 0.02 | 0 | 0 |
| 2 | ○ | 0.75 | 150 | 0.02 | 1 | 0 |
| 3 | ○ | 0.75 | 100 | 0.02 | 1.5 | 0.5 |
| 4 | ○ | 0.75 | 45 | 0.05 | 2 | 0.5 |
| 5 | ○ | 1.0 | 150 | 0.02 | 2 | 1 |
| 6 | ○ | 1.0 | 100 | 0.05 | 4 | 1.5 |
| 7 | ○ | 1.5 | 150 | 0.02 | 6 | 2 |
| 8 | ○ | 1.5 | 100 | 0.1 | 10 | 2.5 |
| 9 | ○ | 1.5 | 100 | 0.05 | 19 | 5 |
| 10 |   | 1.5 | 45 | 0.01 | 24 | 7 |
| 11 | ○ | 2.0 | 150 | 0.1 | 18 | 4 |
| 12 |   | 2.0 | 100 | 0.01 | 40 | 10 |
| 13 |   | 2.0 | 45 | 0.01 | 53 | 15 |

Note 1:
The mark ○ indicates that the sample is that of the present invention.
Note 2:
Each number is the average of 4 measured values.

As can be seen from Table 1, only a few spots of fog were caused in the samples of the present invention obtained by using wood kraft pulp having a number of spots tarnished by silver tarnishing reaction defined in the specification of 20 or less. It can be clearly seen that the number of tarnished spots of wood kraft pulp is preferably 10 or less, more preferably 5 or less.

EXAMPLE 2

The process of Example 1 was repeated except for using the following wood kraft pulps in place of the wood kraft pulps used in Example 1.

By bleaching by the process "C E H D P D", there were obtained hardwood bleached pulps explained in Table 2, for which the number of spots tarnished by silver tarnishing reaction defined in the specification was as shown in Table 2. The conditions of production process of the hardwood kraft pulps were as follows. The amount of an oil-based anti-foaming agent containing mineral oil as a constituent which was present in a step of washing unbleached kraft pulp, was 0.1, 0.7, 1.0, 1.5 or 2.0 kg per ton based on oven-dry basis of pulp. The calcium content of unbleached kraft pulp defined in the specification was 3,000, 4,000 or 5,500 ppm. The pH of a kraft pulp slurry in the chlorine treatment step was 1.5, 2.0 or 2.7. The above process conditions were adjusted so as to become each combination shown in Table 2, and other process conditions were properly adjusted.

The results obtained are shown in Table 2.

TABLE 2

| Sample No. | Note 3 | Amount of anti-foaming agent present (kg) | Calcium content of unbleached pulp (ppm) | pH of pulp slurry in chlorine treatment step | Number of spots of silver tarnishing (Note 4) | Number of spots of fog (Note 4) |
| --- | --- | --- | --- | --- | --- | --- |
| 1 | ○ | 0.1 | 4000 | 2.0 | 0 | 0 |
| 2 | ○ | 0.7 | 3000 | 2.0 | 1 | 0.25 |
| 3 | ○ | 0.7 | 5500 | 1.5 | 3 | 1 |
| 4 | ○ | 0.7 | 4000 | 1.5 | 1.5 | 0.5 |
| 5 | ○ | 1.0 | 3000 | 1.5 | 2 | 0.75 |
| 6 | ○ | 1.0 | 4000 | 2.7 | 6 | 1.5 |
| 7 |   | 1.0 | 5500 | 2.7 | 21 | 6 |
| 8 | ○ | 1.5 | 3000 | 1.5 | 8 | 2.25 |
| 9 | ○ | 1.5 | 4000 | 2.0 | 15 | 4 |
| 10 | ○ | 1.5 | 5500 | 1.5 | 14 | 3.5 |
| 11 | ○ | 2.0 | 3000 | 1.5 | 18 | 4 |
| 12 |   | 2.0 | 4000 | 2.7 | 31 | 8 |
| 13 |   | 2.0 | 5500 | 2.0 | 48 | 13 |

Note 3:
The mark ○ indicates that the sample is that of the present invention.
Note 4:
The average of 4 measured values.

As can be seen from Table 2, only a few spots of fog were caused sin the samples of the present invention obtained by using wood kraft pulp having a number of spots tarnished by silver tarnishing reaction defined in the specification of 20 or less. It can be clearly seen that the number of tarnished spots of wood kraft pulp is preferably 10 or less, more preferably 5 or less.

EXAMPLE 3

Supports for photosensitive materials were obtained by the use of each of the same wood kraft pulps as used in Example 1 having a number of spots tarnished by silver tarnishing reaction of 2 or 40, respectively, per area of 297 mm×210 mm, in the same manner as in Example 1, except for changing the basis weight of base paper to 160 g/m² and the thickness of each of the resin layers on the obverse and reverse sides to 30 μ.

Subsequently, the resin surface on the obverse side containing the titanium dioxide pigment of each support for photosensitive materials was subjected to corona treatment, after which the following emulsion layer and a protective layer therefor were formed on the resin surface to obtain photographic paper. The emulsion layer comprised a neutral-process silver halide photographic emulsion which had a halogen composition of AgBr/AgCl=95/5 and an average particle size of 0.8 μ, had been sensitized to the highest sensitivity by sulfur sensitization, comprised a mixed crystal of [1, 0, 0] plane and [1, 1, 1] plane, and had been prepared by forming and dispersing silver halide particles in 4.8 g of gelatin in an amount of 9.6 g in terms of silver nitrate in the presence of $1.0 \times 10^{-5}$ g of potassium hexachloroiridate (III). The emulsion layer further comprised a yellow color coupler, gelatin necessary for film formation, and adequate amounts of a stabilizer, blue-sensitive sensitizing dye, coating assistant, hardener, thickener, etc. The emulsion layer was coated on the resin surface together with the protective layer in an amount of 0.6 g/m² in terms of silver nitrate and 1.5 g/m² in terms of gelatin so as to place the protective layer on the emulsion layer. The protective layer comprised gelatin in an amount of 1.5 g/m², a coating assistant, a thickener, a hardener, etc.

Samples obtained by drying thus obtained photographic papers after the coating were stored at 50° C. and 80% RH for 4 days. Thereafter, a piece of each sample was subjected to color development and spots of fog were counted. In addition, another piece of each sample after the heating and storage was uniformly exposed to light so as to adjust the yellow coloring density to 0.4, and then subjected to color development, after which the number of sensitized spots per area of 297 mm×210 mm was reckoned.

Consequently, no defective spot was observed at all in the sample of the present invention obtained by using the wood kraft pulp having a number of spots tarnished by silver tarnishing reaction of 2. On the other hand, several spots of fog and a large number of sensitized spots were observed in the sample obtained by using the wood kraft pulp having a number of spots tarnished by silver tarnishing reaction of 40.

EXAMPLE 4

Base papers for a support for photosensitive materials were produced by the use of each of the same wood kraft pulps as used in Example 1 having a number of spots tarnished by silver tarnishing reaction of 2 or 40, respectively, in the same manner as in Example 1, except for changing the basis weight of the base papers to 135 g/m².

Then, a low-density polyethylene resin (density 0.92 g/cm³, MFR 4.5 g/10 min) was coated on both sides of each base paper by melt extrusion to a thickness of 18 μ at a resin temperature of 330° C. In this cases, both sides of each of the thus obtained supports for photosensitive materials were processed into paper-like matte surfaces.

Subsequently, one surface of each support for photosensitive materials was subjected to corona treatment and then coated with a back coating layer comprising silica particles having an average particle size of 4 μ, gelatin in an amount of 1.0 g/m² and a hardener. Thereafter, the surface reverse to the back coating layer of the support was subjected to corona treatment and then coated with an undercoating layer and an emulsion layer. The undercoating layer comprised carbon black, silica particles having an average particle size of 7 μ, gelatin in an amount of 3.5 g/m² and a hardener. The emulsion layer comprised a neutral-process silver halide emulsion which had a halogen composition of AgBr/AgCl=5/95 and an average particle size of 0.4 μ, had been sensitized to the highest sensitivity by a combination of sulfur sensitization and gold sensitization, and comprised substantially crystals of [1, 0, 0] plane. The emulsion layer further comprised gelatin necessary for film formation and adequate amounts of a stabilizer, orthochromatic sensitizing dye, phenidone, coating assistant, hardener, etc. The emulsion layer was formed in an amount of 1.0 g/m² in terms of silver nitrate and 1.0 g/m² in terms of gelatin so as to be placed on the undercoating layer. After the coating, the support was dried and then heated at 40° C. for 3 days. Thereafter, a coating fluid comprising a copolymer of acrylamide and imidazole, hydroquinone, palladium sulfide nucleus and the like was applied on the emulsion layer in an amount of 1.0 g/m² to obtain a photosensitive material for lithographic printing plate.

Samples obtained by drying the thus obtained photosensitive materials after the application were stored in rolled state at 50° C. and 80% RH for 4 days. Thereafter, each sample was cut up and then subjected to diffusion transfer development, after which the number of defective spots per area of 297 mm×210 mm was reckoned.

Consequently, no defective spot was observed at all in the sample of the present invention obtained by using the wood kraft pulp having a number of spots tarnished by silver tarnishing reaction of 2. On the other hand, in the sample outside the scope of the present invention obtained by using the wood kraft pulp having a number of spots tarnished by silver tarnishing reaction of 40, there were observed a large number of spots of the spot trouble, namely, spots in which transferred silver was absent or thin.

EXAMPLE 5

By bleaching by the process "C E H D P D", there were obtained the hardwood bleached kraft pulps explained in Table 3, for which the number of spots tarnished by silver tarnishing reaction defined in the specification was as shown in Table 3. The conditions of production process of the hardwood kraft pulps were as follows. The amount of an oil-based anti-foaming agent containing mineral oil as a constituent which was present in a step of washing unbleached kraft pulp was 0.7, 1.0, 1.5 or 2.0 kg per ton based on oven-dry basis of pulp. The electric conductivity of thickener before bleaching defined in the specification was 100 $\mu$ /cm. The final reject rate in a liquid-cyclone type cleaner was 0.01, 0.02, 0.05 or 0.1 wt% based on the oven-dry weight of pulp. The above process conditions were adjusted so as to become each of the combinations shown in Table 3 and other conditions were properly adjusted.

Subsequently, using each bleached kraft pulp, base paper wa produced in the same manner as in Example 1.

A resin was applied on both sides of the base paper in the same manner as in Example 1 to produce a support for photosensitive materials. The following two kinds of products were obtained for each hardwood bleached kraft pulp. One of them was obtained in the following manner. Before winding up the support after the application of the resin, the resin surface on the obverse side of the support was subjected to corona treatment and then coated by on-machine coating with a subbing fluid consisting of 4 parts by weight of gelatin 2 parts by weight of a 2% aqueous chrome alum solution, 0.5 parts by weight of 2% solution of a 2-ethylhexyl sulfosuccinate salt in mixture of methanol and water, 0.3 part by weight of a 5% methanolic solution of butyl p-hydroxybenzoate and 93.2 parts by weight of water, so as to adjust the amount of coating of gelatin to 0.2 g/m². The other was the support which had no subbing layer.

Then, the reverse side of each product, i.e., each support for photosensitive materials, was subjected to corona treatment, after which a back coating layer having a composition of gelatin: silica particles with an average particle size of 4 $\mu$=2 : 1 and containing adequate amounts of an antistatic agent, surfactant, hardener and the like, was formed on the reverse side by on-machine coating so as to adjust the amount of coating of gelatin to 4 g/m². Thereafter, the resin surface on the obverse side containing the titanium dioxide pigment of the support for photosensitive materials was subjected to corona treatment, after which an emulsion layer and a protective layer therefor were formed on the resin surface to obtain photographic paper for black-and-white photography. The emulsion layer comprised a neutral-process silver halide photographic emulsion which had a halogen composition of AgBr/AgCl=65/35 and an average particle size of 0.6 $\mu$, had been sensitized to the highest sensitivity by a combination of sulfur sensitization and gold sensitization, comprised substantially crystals of [1, 0, 0] plane, and had been produced by forming and dispersing silver halide particles in 14.4 g of gelatin in an amount of 19.2 g in terms of silver nitrate in the presence of $1.2 \times 10^{-5}$ g of potassium hexachloroiridate (III). The emulsion layer further comprised gelatin necessary for film formation and adequate amounts of a stabilizer, sensitizing dye, coating assistant, hardener, fluorescent whitening agent, thickener, filter dye, etc. The emulsion layer was coated on the resin surface together with the protective layer in an amount of 2.2 g/m² in terms of silver nitrate and 4.4 g/m² in terms of gelatin so as to place the protective layer on the emulsion layer. The protective layer comprised gelatin in an amount of 2 g/m², a coating assistant and a hardener.

Samples obtained by drying the thus obtained photographic papers after the coating were stored at 0° C. and 80% RH for 4 days. Thereafter, each sample was subjected to black-and-white development and the number of spots of fog per area of 297 mm×210 mm was reckoned. The results obtained are shown in Table 3.

TABLE 3

| Sample No. | Note 5 | Production process | | | Number of spots of silver tarnishing (Note 6) | Existence of subbing layer | Number of of spots of fog (Note 6) |
|---|---|---|---|---|---|---|---|
| | | Amount of anti-foaming agent present (kg) | Conductivity of thickener before bleaching ($\mu$mho/cm) | Total reject in cleaner (wt %) | | | |
| 1 | ◯ | 0.75 | 100 | 0.02 | 1.5 | None | 0.5 |
| 2 | ◯ | 0.75 | 100 | 0.02 | 1.5 | Formed | 0 |
| 3 | ◯ | 1.0 | 100 | 0.05 | 4.5 | None | 1.75 |
| 4 | ◯ | 1.0 | 100 | 0.05 | 4.5 | Formed | 0.5 |
| 5 | ◯ | 1.5 | 100 | 0.1 | 10 | None | 3 |
| 6 | ◯ | 1.5 | 100 | 0.1 | 10 | Formed | 1 |
| 7 | ◯ | 1.5 | 100 | 0.05 | 19 | None | 5 |
| 8 | ◯ | 1.5 | 100 | 0.05 | 19 | Formed | 2 |

TABLE 3-continued

| Sample No. | Note 5 | Production process | | | Number of spots of silver tarnishing (Note 6) | Existence of subbing layer | Number of spots of fog (Note 6) |
|---|---|---|---|---|---|---|---|
| | | Amount of anti-foaming agent present (kg) | Conductivity of thickener before bleaching (μmho/cm) | Total reject in cleaner (wt %) | | | |
| 9 | | 2.0 | 100 | 0.01 | 41 | None | 11 |
| 10 | | 2.0 | 100 | 0.01 | 41 | Formed | 4 |

Note 5:
The mark ○ indicates that the sample is that of the present invention.
Note 6:
Each number is the average of 4 measured values.

As can be seen from Table 3, a markedly small number of spots of fog were caused in the samples of the present invention which had been obtained by using wood kraft pulp having a number of spots tarnished by silver tarnishing reaction defined in the specification of 20 or less, and had the subbing layer comprising gelatin. It can be clearly seen that for wood kraft pulp, the number of tarnished spots is preferably 10 or less, more preferably 5 or less.

EXAMPLE 6

The experiment was carried out in the same manner as for sample No. 8 in Example 5, except that the amount of coating of gelatin in the subbing layer was as shown in Table 4.

The results obtained are shown in Table 4.

TABLE 4

| Sample No. | Amount of coating of ggelatin in subbing layer (g/m²) | Number of spots of fog (Note 7) |
|---|---|---|
| 1 | 0 | 5.0 |
| 2 | 0.001 | 4.5 |
| 3 | 0.005 | 3.5 |
| 4 | 0.01 | 2.5 |
| 5 | 0.05 | 2.25 |
| 6 | 0.2 | 2 |
| 7 | 0.5 | 1.0 |
| 8 | 1 | 0.5 |
| 9 | 2 | 0.25 |
| 10 | 4 | 0.25 |

Note 7:
The number is the average of 4 measured values.

As can be seen from Table 4, the occurrence of spotty fog can be reduced by forming the subbing layer. When the amount of coating of gelatin in the subbing layer was more than 2 g/m², serious curling to the silver halide photosensitive layer side was undesirably caused. It can be seen that the amount of coating of gelatin in the subbing layer is preferably 0.005 to 2.0 g/m², more preferably 0.01 to 2 g/m², for inhibiting the occurrence of spotty fog markedly and preventing the undesirable influence on the curling properties.

EXAMPLE 7

The process of Example 5 was repeated except for using the following wood kraft pulp in place of that used in Example 5 and forming a subbing layer in which the amount of coating of gelatin was 0.2 g/m².

By bleaching by the process "C E H D P D", there were obtained the hardwood bleached pulps explained in Table 5, for which the number of spots tarnished by silver tarnishing reaction defined in the specification was as shown in Table 5. The conditions of production process of the hardwood kraft pulps were as follows. The amount of an oil-based anti-foaming agent containing mineral oil as a constituent which was present in a step of washing unbleached kraft pulp, was 0,1 0.7, 1.0, 1.5 or 2.0 kg per ton based on oven-dry basis of pulp. The electric conductivity of thickener before bleaching defined in the specification was 45, 100 or 150 μ /cm. The final reject rate in a liquid-cyclone type cleaner was 0.01, 0.02, 0.05 or 0.1 wt% based on the oven-dry weight of pulp. The above process conditions were adjusted so as to become each of the combinations shown in Table 5 and other process conditions were properly adjusted. When the amount of the anti-foaming agent was less than 1 kg, the prevention of foaming was not sufficient.

TABLE 5

| Sample No. | Note 8 | Production process | | | Number of spots of silver tarnishing (Note 9) | Number of spots of fog (Note 9) |
|---|---|---|---|---|---|---|
| | | Amount of anti-foaming agent present (kg) | Conductivity of thickener before bleaching (μmho/cm) | Total reject in cleaner (wt %) | | |
| 1 | ○ | 0.1 | 150 | 0.02 | 0 | 0 |
| 2 | ○ | 0.75 | 150 | 0.02 | 1 | 0 |
| 3 | ○ | 0.75 | 100 | 0.02 | 1.5 | 0 |
| 4 | ○ | 0.75 | 45 | 0.05 | 2 | 0 |
| 5 | ○ | 1.0 | 150 | 0.02 | 2 | 0 |
| 6 | ○ | 1.0 | 100 | 0.05 | 4.5 | 0.5 |
| 7 | ○ | 1.5 | 150 | 0.02 | 6 | 0.75 |
| 8 | ○ | 1.5 | 100 | 0.1 | 10 | 1 |
| 9 | ○ | 1.5 | 100 | 0.05 | 19 | 2 |
| 10 | | 1.5 | 45 | 0.01 | 24 | 2.75 |
| 11 | ○ | 2.0 | 150 | 0.1 | 18 | 1.75 |
| 12 | | 2.0 | 100 | 0.01 | 41 | 4 |
| 13 | | 2.0 | 45 | 0.01 | 53 | 6 |

Note 8:
The mark ○ indicates that the sample is that of the present invention.
Note 9:
Each number is the average of 4 measured values.

As can be seen from Table 5, a markedly small number of spots of fog were caused in the samples which had been obtained by wood kraft pulp having a number of spots tarnished by silver tarnishing reaction defined in the specification of 20 or less and had the subbing layer comprising gelatin. It can be clearly seen that for wood kraft pulp, the number of tarnished spots is preferably 10 or less, more preferably 5 or less.

EXAMPLE 8

The process of Example 7 was repeated except for using the following wood kraft pulp in place of that used in Example 7.

By bleaching by the process "C E H D P D", there were obtained hardwood bleached pulps explained in Table 6, for which the number of spots tarnished by silver tarnishing reaction defined in the specification was as shown in Table 6. The conditions of production process of the hardwood kraft pulp were as follows. The amount of an oil-based anti-foaming agent containing mineral oil as a constituent which was present in a step of washing unbleached kraft pulp was 0.1, 0.7, 1.0, 1.5 or 2.0 kg per ton based on oven-dry basis of pulp. The calcium content of unbleached kraft pulp defined in the specification was 3,000, 4,000 or 5,500 ppm. The pH of a kraft pulp slurry in the chlorine treatment step was 1.5, 2.0 or 2.7. The above process conditions were adjusted so as to become each of the combinations were properly adjusted.

The results obtained are shown in Table 6.

the thickness of each of the resin layers on the obverse and reverse sides to 30 $\mu$, and that a backcoating layer having a composition of colloidal silica : styrene acrylic latex=1 : 1 and containing adequate amounts of an antistatic agent, a surfactant and the like was formed by on-machine coating in an amount of 0.4 g/m$^2$ in terms of solids, in place of the back coating layer formed in Example 7.

Subsequently, the following emulsion layer and protective layer were formed on the side of each support for photosensitive materials on which the subbing layer had been formed, whereby photographic paper was obtained. The emulsion layer comprised a neutral-process silver halide photographic emulsion which had a halogen composition of AgBr/AgCl=95/5 and an average particle size of 0.8 $\mu$, had been sensitized to the highest sensitivity by sulfur sensitization, comprised a mixed crystal of [1, 0, 0] plane and [1, 1, 1] plane, and had been produced by forming and dispersing silver halide particles in 4.8 g of gelatin in an amount of 9.6 g in terms of silver nitrate in the presence of $1.0 \times 10^{-5}$ g of potassium hexachloroiridate (III). The emulsion layer further comprised a yellow color coupler, gelatin necessary for film formation, and adequate amounts of a stabilizer, blue-sensitive sensitizing dye, coating assistant, hardener, thickener, etc. The emulsion layer was coated on the support together with the protective layer in an amount of 0.6 g/m$^2$ in terms of silver nitrate and 1.5 g/m$^2$ in terms of gelatin so as to place the protective layer on the emulsion layer. The protective

TABLE 6

| | | Production process | | | Number of | |
|---|---|---|---|---|---|---|
| Sample No. | Note 10 | Amount of anti-foaming agent present (kg) | Calcium content of unbleached pulp (ppm) | pH of pulp slurry in chlorine treatment step | spots of silver tarnishing (Note 11) | Number of spots of fog (Note 11) |
| 1 | ○ | 0.1 | 4000 | 2.0 | 0 | 0 |
| 2 | ○ | 0.7 | 3000 | 2.0 | 1 | 0 |
| 3 | ○ | 0.7 | 5500 | 1.5 | 3 | 0.25 |
| 4 | ○ | 0.7 | 4000 | 1.5 | 1.5 | 0 |
| 5 | ○ | 1.0 | 3000 | 1.5 | 2 | 0 |
| 6 | ○ | 1.0 | 4000 | 2.7 | 6 | 0.75 |
| 7 | | 1.0 | 5500 | 2.7 | 21 | 2.25 |
| 8 | ○ | 1.5 | 3000 | 1.5 | 8 | 1 |
| 9 | ○ | 1.5 | 4000 | 2.0 | 15 | 1.5 |
| 10 | ○ | 1.5 | 5500 | 1.5 | 14 | 1.5 |
| 11 | ○ | 2.0 | 3000 | 1.5 | 18 | 1.75 |
| 12 | | 2.0 | 4000 | 2.7 | 31 | 3.5 |
| 13 | | 2.0 | 5500 | 2.0 | 48 | 5 |

Note 10:
The mark ○ indicates that the sample is that of the present invention.
Note 11:
The average of 4 measured values.

As can be seen from Table 6, a markedly small number of spots of fog were caused in the samples of the present invention which had been obtained by using wood kraft pulp having a number of spots tarnished by silver tarnishing reaction defined in the specification of 20 or less, and had a subbing layer comprising gelatin. It can be clearly seen that for wood kraft pulp, the number of tarnished spots is preferably 10 or less, more preferably 5 or less.

EXAMPLE 9

Supports for photosensitive materials were obtained in the same manner as in Example 7, except that there were used only the same wood kraft pulps as used in Example 7 having a number of spots tarnished by silver tarnishing reaction of 2 or 53, respectively, that the basis weight of base paper was changed to 160 g/m$^2$ and layer comprised gelatin in an amount of 1.5 g/m$^2$, a coating assistant, a thickener, a hardener, etc.

Samples obtained by drying the thus obtained photographic papers after the coating were stored at 50° C. and 80% RH for 4 days. Thereafter, a piece of each sample was subjected to color development and spots of fog were counted. Another piece of each sample after the heating and storage was uniformly exposed to light so as to adjust the yellow coloring density to 0.4, and then subjected to color development, after which the number of sensitized spots per area of 297 mm × 210 mm was reckoned.

Consequently, no defective spots was observed at all in the sample of the present invention obtained by using the wood kraft pulp having a number of spots tarnished by silver tarnishing reaction of 2. On the other hand, several spots of fog and sensitized spots were observed in the sample outside the scope of the present invention obtained by using the wood kraft pulp having a number of spots tarnished by silver tarnishing reaction of 53.

EXAMPLE 10

Supports for photosensitive materials were produced in the same manner as in Example 7, except for using only the same wood kraft pulps as used in Example 7 having a number of spots tarnished by silver tarnishing reaction of 2 or 53, respectively.

Subsequently, an emulsion layer was formed on the side of each support for photosensitive materials on which an undercoating layer had been formed. The emulsion layer comprised a neutral-process silver halide emulsion which had a halogen composition of AgBr/AgCl=30/70 and an average particle size of 0.3 $\mu$, had been sensitized to the highest sensitivity by a combination of sulfur sensitization and gold sensitization, and comprised substantially crystals of [1, 0, 0] plane. The emulsion layer further comprised gelatin necessary for film formation and adequate amounts of a stabilizer, sensitizing dye, phenidone, coating assistant, hardener, etc. The emulsion layer was coated on the support in an amount of 1.0 $g/m^2$ in terms of silver nitrate and 1.0 $g/m^2$ in terms of gelatin. Thus, photosensitive materials for a negative for diffusion transfer process were obtained.

Samples obtained by drying the photosensitive materials after the coating were stored at 50° C. and 80% RH for 4 days and then cut up. Thereafter, a piece of each sample was placed on a material for positive for diffusion transfer process which had been produced by forming on a support a coating layer comprising palladium sulfide sol in an amount of 1.0 $g/m^2$, a polyvinyl alcohol, an adequate amount of a surfactant, etc. Then, diffusion transfer development was carried out and the number of defective spots per area of 297 mm ×210 mm was reckoned in the piece of the sample.

Consequently, no defective spot was observed at all in the sample of the present invention obtained by using the wood kraft pulp having a number of spots tarnished by silver tarnishing reaction of 2. On the other hand, in the sample outside the scope of the present invention obtained by using the wood kraft pulp having an umber of spots tarnished by silver tarnishing reaction of 53, there were observed large number of spots showing the spot trouble, namely, spots in which transferred silver was absent or thin.

From the results described above, it can be seen that the present invention makes it possible to provide an excellent support for photosensitive materials which is obtained by using paper composed mainly of natural pulp, as base paper, and in which the tendency of the spot trouble to occurrence is markedly repressed when a silver halide photosensitive layer is provided on the support.

What is claimed is:

1. A support for photosensitive materials which comprises base paper comprising natural kraft pulp, and a resin layer formed on the base paper, said natural kraft pulp being produced by digesting wood chips by a kraft process, and washing the digested product in the presence of an anti-foaming agent or a foam-inhibitor, followed by bleaching by the use of chlorine or an oxidizing agent containing at least one chlorine atom, and said natural kraft pulp having a number of tarnished or stained areas by silver tarnishing reaction of 20 or less.

2. A support according to claim 1, wherein a subbing layer comprising a hydrophilic polymer is formed on the resin layer.

3. A support according to claim 2, wherein the resin layer comprises a polyolefin resin.

4. A support according to claim 3, wherein the polyolefin resin is a polyethylene type resin.

5. A support according to claim 2, wherein the anti-foaming agent or the foam-inhibitor comprises mineral oil.

6. A support according to claim 2, wherein the anti-foaming agent or the foam-inhibitor is used in an amount of 0.1 to 1.5 kg per ton based on oven-dry basis of unbleached pulp.

7. A support according to claim 2, wherein the number of spots tarnished by silver tarnishing reaction is 10 or less.

8. A support according to claim 2, wherein the subbing layer comprises the hydrophilic polymer in a proportion of 0.005 to 2.0 $g/m^2$.

9. A support according to claim 1, wherein the resin layer comprises a polyolefin resin.

10. A support according to claim 9, wherein the polyolefin resin is a polyethylene type resin.

11. A support according to claim 1, wherein the anti-foaming agent or the foam-inhibitor comprises mineral oil.

12. A support according to claim 1, wherein the anti-foaming agent or the foam-inhibitor is used in an amount of 0.1 to 1.5 kg per ton based on oven-dry basis of unbleached pulp.

13. A support according to claim 1, wherein the number of spots tarnished by silver tarnishing reaction is 10 or less.

14. A support according to claim 1, wherein the hydrophilic polymer is gelatin.

* * * * *